United States Patent [19]

Steinberg

[11] Patent Number: 5,257,121
[45] Date of Patent: Oct. 26, 1993

[54] MULTI-RESOLUTION SPATIAL INTEGRATION SIGNAL PROCESSOR AND METHOD

[75] Inventor: Richard A. Steinberg, Columbia, Md.

[73] Assignee: The Johns Hopkins University, Baltimore, Md.

[21] Appl. No.: 574,027

[22] Filed: Aug. 29, 1990

[51] Int. Cl.⁵ .............................................. H04N 1/40
[52] U.S. Cl. ..................... 358/447; 358/464; 358/125; 356/5; 364/424.01; 382/47
[58] Field of Search ................. 358/125, 126, 95, 445, 358/447, 458, 463, 464; 356/5; 364/424.01; 382/47

[56] References Cited

U.S. PATENT DOCUMENTS

| | | | |
|---|---|---|---|
| 3,604,803 | 9/1971 | Kahn | 356/5 |
| 4,692,882 | 9/1987 | Shovgaard et al. | 364/424.01 |
| 4,805,031 | 2/1989 | Powell | 358/463 |
| 4,821,334 | 4/1989 | Ogino et al. | 358/458 |
| 4,823,194 | 4/1989 | Mishima et al. | 358/125 |
| 4,853,779 | 8/1989 | Hammer et al. | 358/133 |
| 4,853,795 | 8/1989 | Morton et al. | 358/447 |
| 4,864,396 | 9/1989 | Martens | 358/133 |
| 4,893,923 | 1/1990 | Javan | 356/5 |
| 4,912,569 | 3/1990 | Petilli | 358/458 |
| 5,027,413 | 6/1991 | Barnard | 358/125 |

*Primary Examiner*—Edward L. Coles, Sr.
*Assistant Examiner*—Thomas L. Stoll
*Attorney, Agent, or Firm*—Francis A. Cooch

[57] ABSTRACT

A signal processor and method for maximizing the detection range of imaging infrared seekers against ship targets. The invention comprises a bank of two-dimensional spatial filters, having rectangular kernels matched to targets of various aspect ratios and sizes, implemented in a separable form that appears well suited to processing in real-time image data acquired sequentially by column.

26 Claims, 10 Drawing Sheets

| | Azimuth index, n | | | | |
|---|---|---|---|---|---|
| | 4 | 8 | 16 | 32 | 64 |
| Elevation Index, k  2 | 2x4 | 2x8 | 2x16 | 2x32 | |
| 4 | 4x4 | 4x8 | 4x16 | 4x32 | 4x64 |
| 8 | | 8x8 | 8x16 | 8x32 | 8x64 |

Origin of coordinates

FIG. 19

MULTI-RESOLUTION SPATIAL INTEGRATION SIGNAL PROCESSOR AND METHOD

STATEMENT OF GOVERNMENTAL INTEREST

The Government has rights in this invention pursuant to Contract No. N00039-89-C-5301 awarded by the Department of the Navy.

BACKGROUND OF THE INVENTION

The invention relates to signal processing and, more specifically, to a multi-resolution spatial integration signal processor and method for detecting objects having minimum contrast relative to their background in a digitized two-dimensional image.

Self-guided missiles have demonstrated high effectiveness in operations against surface ships. Both infrared (IR) and radio frequency (RF) means have historically each found application as the sensing element (seeker) in antiship missile (ASM) guidance units. Some well-known advantages of IR technology in this application include passive operation, good resistance to jamming, and high spatial resolution.

The impetus for high spatial resolution follows from potential operational needs for target classification: assuming adequate signal-to-noise ratio (SNR), high classification accuracy requires high spatial resolution, regardless of whether the imagery is interpreted by a man or processed by a computer.

A key limitation of IR ASM seekers is limited range performance under conditions of poor atmospheric visibility. Means previously investigated for maximizing IR sensor SNR, relevant to the ASM seeker application, include waveband optimization, advanced IR detector developments, and multi-frame image processing.

Despite the methods described above, ASM acquisition range is still an important performance index. Improvements in acquisition range (over ranges obtained by hot-spot detection) remains an important objective, in the design of next generation antiship missile seekers.

An early multi-resolution processing application involved the use of quad trees for encoding 1-bit images (see D.H. Ballard and C.M. Brown, *Computer Vision*, Prentice Hall, Inc., Englewood Cliffs, N.J. (1982)). A variety of additional multi-resolution image processing applications and computational methods are discussed in *Multiresolution Image Processing and Analysis*, A. Rosenfeld, ed., Springer-Verlag, Berlin, 1984, and L. O'Gorman and A.C. Sanderson, "A Comparison of Methods and Computation for Multi-Resolution Low- and Band-Pass Transforms for Image Processing," *Computer Vision, Graphics, and Image Processing*, Vol. 37, pp. 386–401 (1987).

Obviously, the idea of performing simultaneous analysis of images at multiple spatial resolutions is not new. However, previous algorithms and special purpose computers designed for multi-resolution processing are organized around the idea of an image "pyramid", with the original image at the pyramid's base, and successively reduced resolution images at successively higher levels in the pyramid.

One aspect of an image pyramid is that the progressively reduced resolution images have progressively reduced dimensionality, i.e., a progressively smaller number of samples per image, giving rise to a tapering of the pyramid at its top to a single picture element. The earlier multi-resolution approaches generally degrade resolution simultaneously in both dimensions: moving up one level in the pyramid implies reduced resolution in both image coordinates. The previous multi-resolution techniques retain full pixel-level information for images at all resolutions. Consequently, estimates of memory requirements include allowing for full-frame memory at the original, highest-detail, resolution. Finally, the earlier approaches are not designed to exploit the characteristics of any particular image-forming process. Thus, memory requirements and execution speed are independent of whether the image is acquired one column at a time, via a single pixel raster, etc.: in all cases a full frame must be acquired and buffered before the data can be processed.

SUMMARY OF THE INVENTION

The present invention, which is designated multi-resolution spatial integration, optimizes the detection range of infrared sensors against large area targets, such as ships, by performing detection of targets having minimum contrast relative to their background, in a digitized two-dimensional image. The single-frame signal processing approach of the invention is complementary to earlier multi-frame approaches for SNR optimization.

The invention is implemented in a dimension-separable multi-resolution signal processor or multi-resolution spatial integrator (MRSI). The MRSI utilizes the concept of synchronous area integration to create a multi-resolution spatial filter array. The output of a linear array scanning sensor is smoothed and decimated four-fold in time and then sent to an area-averaging processor where the waveforms comprising the image are first averaged in the cross-scan and then in the in-scan directions to produce an array of reduced resolution images. After estimation and subtraction of background noise, the images are thresholded and a forced-choice detection made. The invention provides about ten-fold SNR enhancement (processing gain) relative to hot-spot detection with the gain being computable, with no more than about 10% maximum error in every case, as $G = \eta N_{PIX}^{\frac{1}{2}}$ ($\eta = 0.81$ and $N_{PIX}$ is number of pixels occupied by the target in the image).

The invention has none of the disadvantages described above for image "pyramid" multi-resolution processing. Images at reduced resolution developed by MRSI are generally not reduced in dimensionality: the sequence of reduced resolution images do not taper in size. Spatial resolution is reduced independently in each image coordinate, so that image resolution in one coordinate does not imply a unique resolution in the orthogonal coordinate.

Unlike the more general pyramid-based approaches, MRSI is not a generic tool for image analysis. MRSI works best when the image is relatively simple, containing a number of spatially separated "blobs". The MRSI is highly specialized to maximize SNR against rectangular and nearly-rectangular targets of known orientation, but whose size, aspect ratio, and position in the image are unknown.

The MRSI approach is by design ideally suited for processing data from a linear array scanning sensor, i.e., image data acquired sequentially by column. The adaptive threshold implemented by MRSI is designed to discard almost all pixel-level information at the higher image resolutions. Memory requirements for implementation are very modest relative to other multi-resolution techniques.

For a more complete appreciation of the invention, attention is invited to the following detailed description of a preferred embodiment of the invention taken with the figures of the drawings. The scope of the invention, however, is limited only through the claims appended hereto.

DETAILED DESCRIPTION OF THE PREFERRED EMBODIMENT

Figure 1:
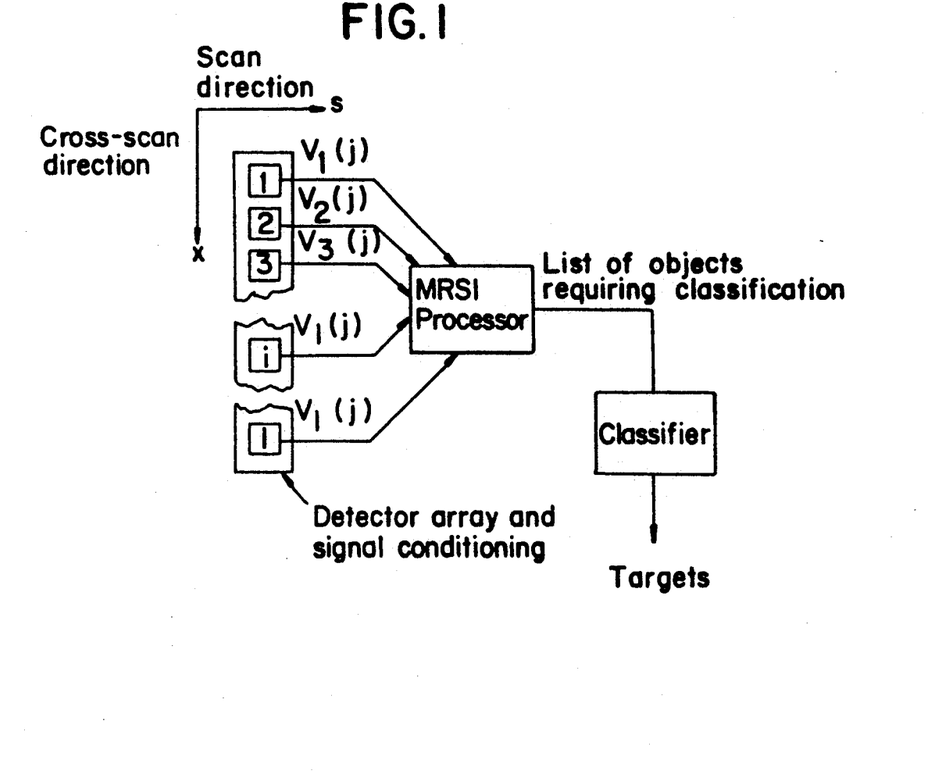
FIG. 1 is a block diagram of a scanning infrared sensor connected to the invention.

We begin the description of the invention with the assumption that it is attached to an imaging sensor composed of I individual detectors. The sensor performs surveillance of a scene once very $T_F$ seconds, where the interval $T_F$ is called the sensor's "frame time" (FIG. 1).

The angular dimensions of a single detector's field-of-view, denoted as $\alpha$ (in-scan) and $\beta$ (cross-scan) are collectively referred to as the sensor's "spatial resolution" or "instantaneous field-of-view" (IFOV) and are specified in milliradian (mr) units. The voltage, $V_i(j)$, read out from detector i at sampling time j is proportional to the integral of the scene radiance over a rectangular region of angular dimensions $\alpha \times \beta$.

Figure 2:
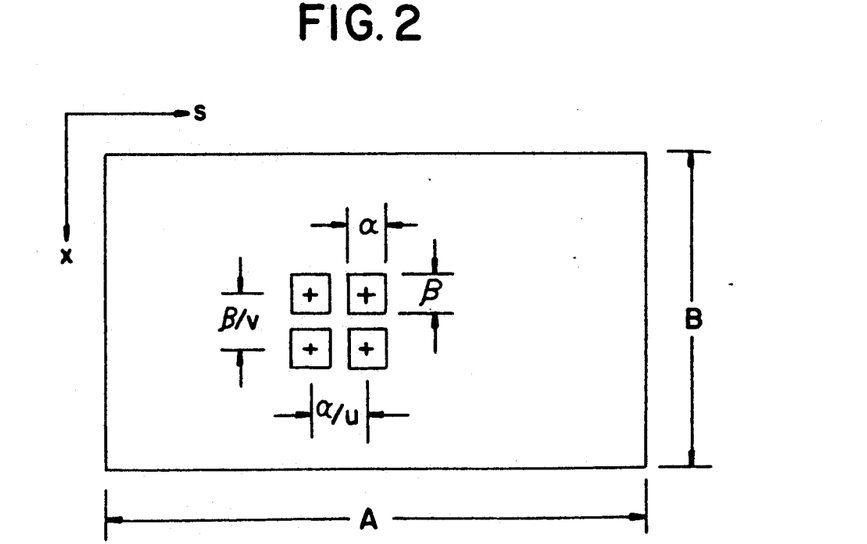
FIG. 2 is a diagram illustrating dimensions related to a scanning sensor.

The viewed scene is assumed to be a rectangle of angular dimensions $A \times B$, mr. The sensor IFOV subdivides the total scene into a rectangular grid of samples, each of angular dimensions $\alpha \times \beta$, mr. The total scene (also sampling geometry are depicted in FIG. 2. Also shown in FIG. 2 is a rectangular coordinate frame (s,x). Samples are obtained on a uniform rectangular grid, with adjacent samples separated by angle $\alpha/u$ in the s-direction and by angle $\beta/v$ in the x-direction.

Depending on how the sensor is implemented, the spatial samples may be gapped, overlapped, or precisely adjacent. FIG. 2 depicts an example for which the samples are gapped in both the s- and x-directions, i.e., for which $$u, v < 1.$$

Samples are precisely adjacent in the s-direct when $$u = 1.$$

Samples are overlapped in the s-direction when $$u > 1.$$

Analogously, samples are precisely adjacent and overlapped in the x-direction when $v = 1$ and $v > 1$, respectively.

In general, the ratios of sample size to sample spacing, u and v, are different in value. For example, depending on the sensor's implementation, samples may be adjacent in s and gapped in $x(u=1, v<1)$ or overlapped in s and adjacent in $x(u>1, v=1)$; etc.

Regardless of the numerical values of the parameters defined in FIG. 2, the sensor develops every $T_F$ seconds a matrix of numbers, $\{V_i(j)\}$, in which each matrix element is proportional to the brightness of the scene, averaged over a neighborhood of dimensions $\alpha \times \beta$, centered on the angular coordinates $(j\alpha/u, i\beta/v)$.

The detector index, i, is also the cross-channel image coordinate, taking on the range of values $$1 \leq i \leq I = [Bv/\beta], \quad (1)$$

where square brackets [.]denote the integer part of their argument. Similarly, the discrete time variable, j, is also the in-scan image coordinate taking on the range of values $$1 \leq j \leq J = [Au/\alpha]. \quad (2)$$

During any given sampling interval (i.e., for a given value of j), the invention's input is a vector $V_i$ of dimension I. Equivalently, the processor operates upon an input consisting of I digital waveforms.

In the following description of the invention, a scanning sensor implementation is assumed in which the s-coordinate (FIG. 2) coincides with the direction of scan, and the x-coordinate is variously referred to as the "cross-scan" or "cross-channel" coordinate. Quantity u is conventionally referred to as the in-scan sample factor, having units of samples per dwell. The invention is also readily adapted to staring mosaic sensors.

The design of the invention begins with a processor configured as a parallel array of spatial matched filters, in which each filter in the array corresponds to a possible target shape. This processor is based on a conceptual model of the human vision system detection process and is called a perfect synchronous integrator (PSI). The PSI is able to accommodate target profile uncertainties in shape, scale, position, and orientation.

The first step in reducing PSI complexity to obtain a practical implementation is to note that the rotational degree of freedom is unneeded in the application of the invention: to sea-skimming missiles flying wings-level, the major axis of ship targets will always appear parallel to the horizon.

Figure 3:
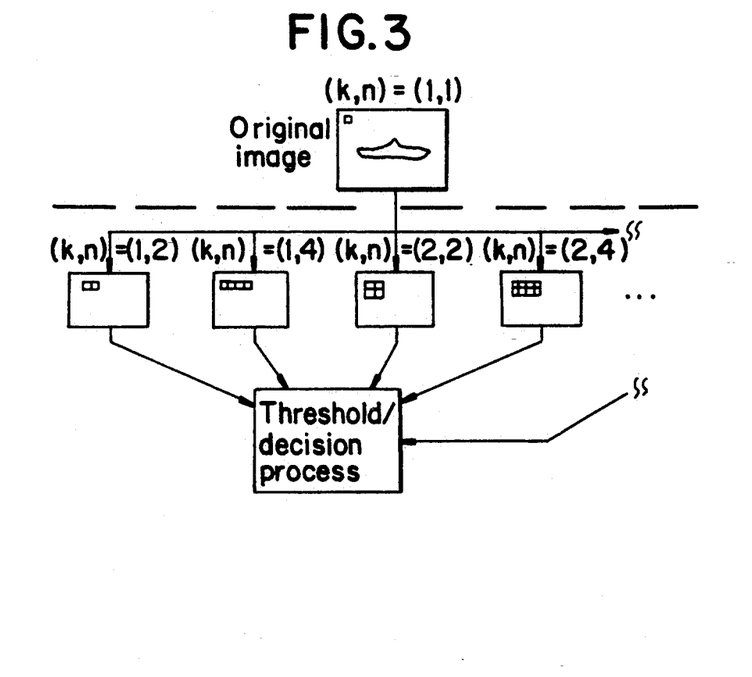
FIG. 3 is a schematic diagram of the concept of the invention as a bank of parallel spatial filters.

The next step in reducing PSI complexity is to constrain the spatial filter responses to be rectangles. Thus, when the original image consists of a single bright pixel against an otherwise uniform background, the output image of each filter will be a rectangle of dimensions k pixels (cross-scan) by n pixels (in-scan). Consequently, each filter in the filter bank can be labeled with its "resolution indices", k and n, and generally described in terms of "the (k,n) filter". The resulting suboptimal approximation of a PSI is depicted in FIG. 3.

Finally, the required number of filters in the filter bank is further limited by constraining the resolution indices to be powers of 2, between specified minimum and maximum values based on the likely target angular dimensions at initial detection. For example, one may choose $$\log_2 k = 1, 2, 3$$

$$\log_2 n = 2, 3, \ldots 6, \quad (3)$$

corresponding to a filter bank comprised of 15 spatial filters. The number of spatial filters may be reduced still further by culling out filters that correspond to unlikely target aspect ratios. As indicated in FIG. 4 for example, there may be very little penalty in removing filters corresponding to $(k,n)=(8,4)$ and $(k,n)=(2,64)$; targets having such aspect ratios can still be detected, although with reduced SNR gain.

Figure 4:
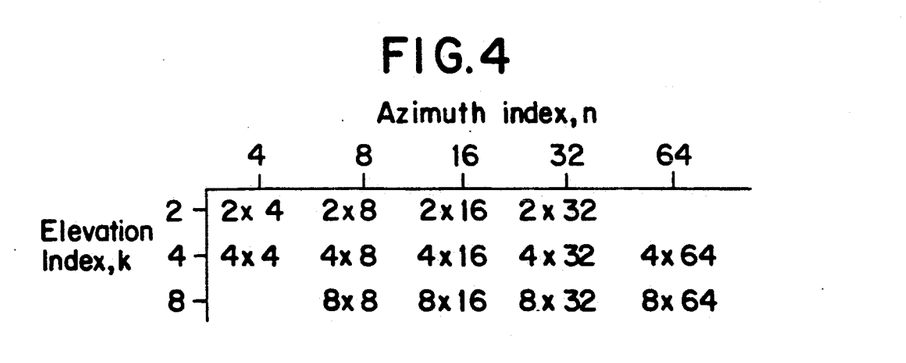
FIG. 4 shows a matrix of spatial resolutions for a spatial filter array.

The parallel bank of 13 filters corresponding to FIG. 4 may be conceived as having a single image as input and generating 13 blurred/reduced resolution images as its output. From the standpoint of data throughput requirements, the sampling rate for each of the 13 reduced resolution images is substantially lower than for the original full resolution image.

Considering FIG. 3, $n=4$ is the lowest resolution at which the scene need be observed from the standpoint of matched filtering for detection. From this we derive the structure of a detection preprocessor depicted in FIG. 5. Each of the I detector channels is processed by an identical such preprocessor.

Figure 5:
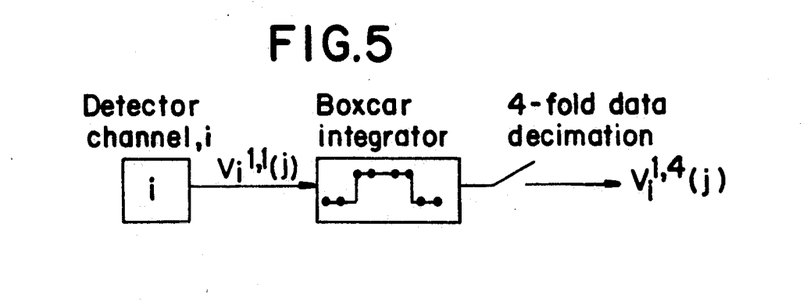
FIG. 5 is a block diagram of the invention's detection preprocessor.

The notation for image data generally is $$V_i^{k,n}(j)$$

where indices (i,j) refer to position in the image (FIG. 1) and indices (k,n) denote the spatial resolution of the image. Thus $$V_i^{1,1}(j)$$

in FIG. 5 is the image data as originally output from the detector array, at the original $(k,n)=(1,1)$ resolution. As shown in FIG. 5, the voltage time waveform from detector i, denoted $$V_i^{1,1}(j)$$

(where j is time) is smoothed by a boxcar integrator and decimated four-fold in time; i.e., only one of each four samples output from the boxcar integrator is used in subsequent signal processing stages. The effect of the detection preprocessing step is to provide an immediate two-fold improvement in SNR and an immediate four-fold reduction in subsequent data throughput requirements.

Of course, the two-fold SNR improvement is only experienced for targets at least four samples in in-scan extent; smaller targets will have less SNR improvement with a single-sample target actually experiencing a two-fold degradation in SNR. This drawback is more apparent than real for the following two reasons:

a. Subsequent to detection, it is necessary to transfer processing to a classification step. Targets occupying $\leq 4$ samples in-scan are too small to permit image-based classification.

b. Size is a key indicator of ship target value. Small ships are generally of less interest as targets than are large ships.

The input/output relationship for the FIG. 5 preprocessor may be expressed as $$V_i^{1,4}(j) = \frac{1}{4} \sum_{k=0}^{3} V_i^{1,1}(4j - k), \quad (4)$$

$$j = 1, 2, \ldots [Au/4\alpha].$$

The maximum value of j in eq. 4

$$j_{max} = [Au/4\alpha] \quad (5)$$

is only one-fourth as large as $j_{max}$ in eq. 2 due to the four-fold decimation step. Writing $$A = \dot{\theta} T_F \quad (6)$$

where
A = total in-scan field-of-view, mr
$\dot{\theta}$ = angular rate-of-scan mr/s
$T_F$ = frame time, s and recognizing that the sample rate per channel, $f_s$ (Hz), is given by $$f_s = j_{max}/T_F \quad (7)$$

from eqs. 5–7, it can be found that $$f_s = \dot{\theta} u/4\alpha \quad (8)$$

The factor 4 in the denominator of eq. 8 is due to the decimation step in FIG. 5.

The factor ($\frac{1}{4}$) preceding the sum in eq. 4 is a normalization that may not be required in a hardware realization of the processor.

Figure 6:
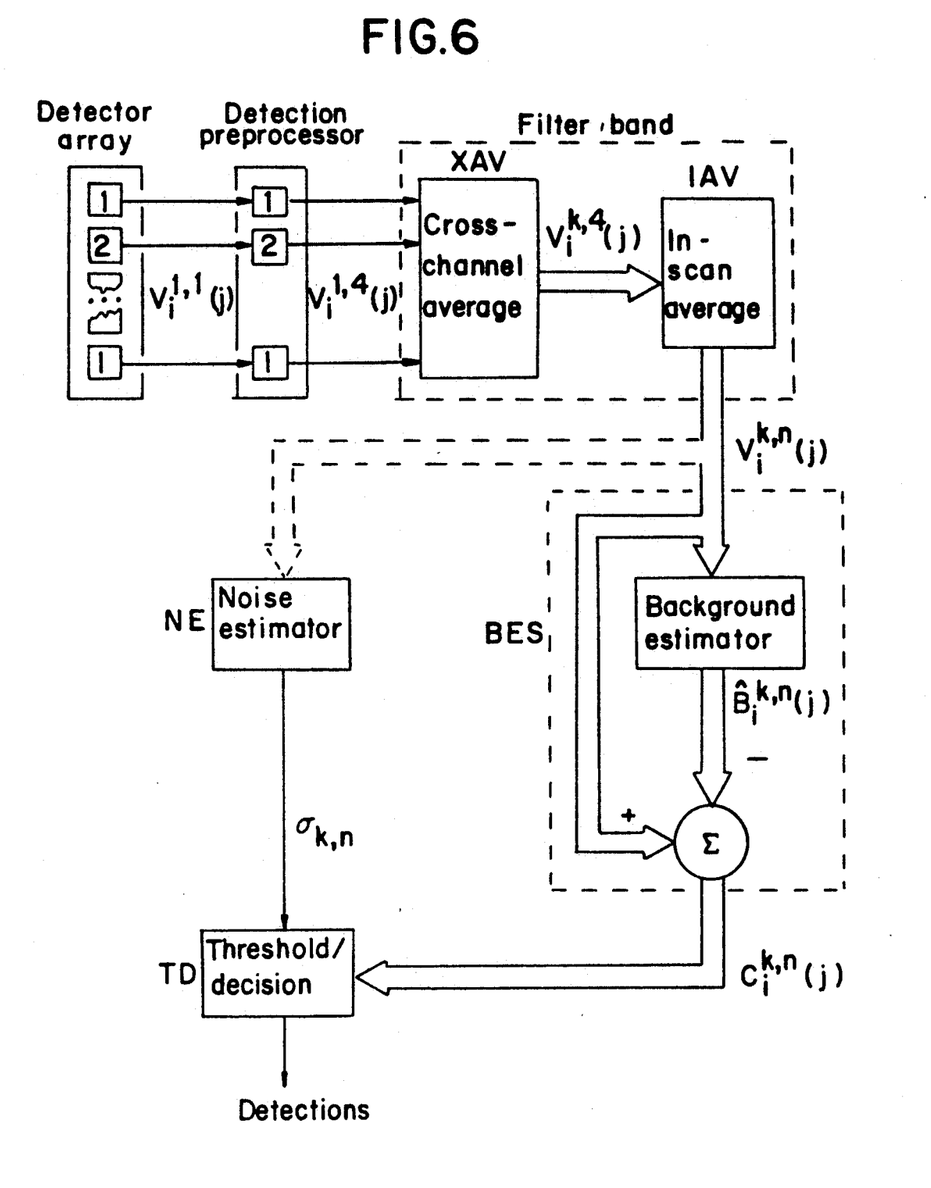
FIG. 6 is a block diagram of the invention.

The general structure of the invention is shown in FIG. 6. The elements of MRSI are:
 a. the detection preprocessor (FIG. 5),
 b. cross-channel averaging processor,
 c. in-scan averaging processor,
 d. background estimation and subtraction (BES), and
 e. noise estimation and threshold/decision (NE and T/D).

Although the detector array depicted in FIG. 6 is comprised of square non-staggered elements with a small cross-channel gap, the MRSI is readily applied to arrays having all possible combinations of the following attributes: arbitrary values of v; stagger offset between adjacent detector channels; and time-delay-and-integration.

The means for implementing detection preprocessing as in FIG. 5 is an array of I identical processing modules operating simultaneously and uncoupled; i.e., in a purely parallel fashion. A means for implementing an array of spatial filters at varying spatial resolutions is described below. Like the preprocessor, FIG. 5, the multi-resolution processing portion or area-averaging processor of the MRSI comprises a large number of simple and identical processing elements, such as delay/memory elements, summers, and fixed gain amplifiers, operating in parallel. All gains are reciprocal powers of two and, therefore, implementable without approximation as bit shift operations.

The spatial filter algorithm is separable in in-scan and cross-scan operations, with the cross-scan operations being performed first. Thus, we operate on the detection preprocessor outputs, viz., $$V_i^{1,4}(j),$$

with a "cross-channel averaging processor", XAV, to obtain $$V_i^{k,4}(j), k=2, 4, 8$$

which are then provided as input to an "in-scan averaging processor", IAV, to obtain the complete set of reduced resolution images, $$V_i^{k,n}(j), k = 2, 4, 8$$
$$n = 4, 8, 16, 32, 64$$

Figure 7:
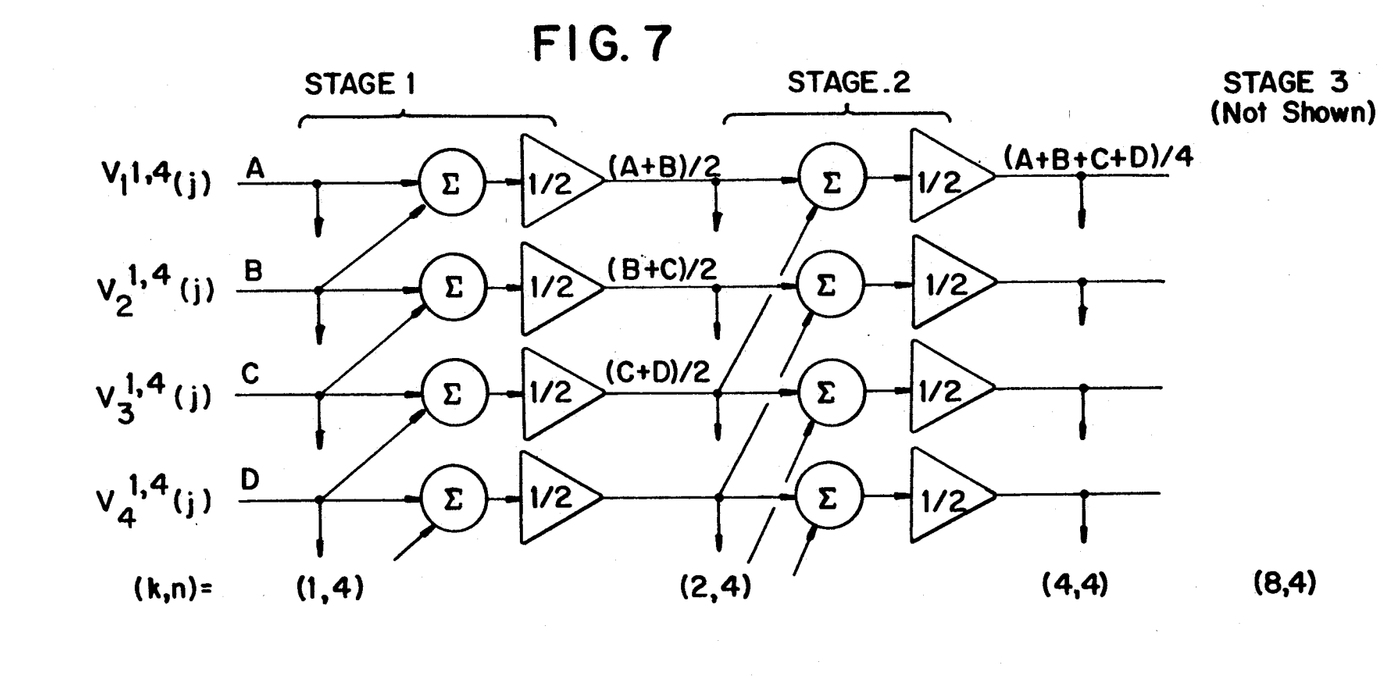
FIG. 7 is a schematic of the cross-channel averaging (XAV) processor of the invention.

The structure of the cross-channel averaging processor, XAV, is shown in FIG. 7. Although three stages of cross-channel processing are required to obtain the three levels of cross-channel resolution indicated in FIG. 4 (k=2, 4, and 8), for simplicity of illustration, only two of the stages are depicted. Again for simplicity, in FIG. 7, the four quantities A, B, C, and D are defined as follows:

$$A = V_1^{1,4}(j)$$
$$B = V_2^{1,4}(j)$$
$$C = V_3^{1,4}(j)$$
$$D = V_4^{1,4}(j)$$
(9)

Through the first stage of cross-channel averaging, we obtain $$V_1^{2,4}(j) = (A+B)/2 = \tfrac{1}{2}[V_1^{1,4}(j) + V_2^{1,4}(j)]$$
$$V_2^{2,4}(j) = (B+C)/2 = \tfrac{1}{2}[V_2^{1,4}(j) + V_3^{1,4}(j)]$$
$$V_3^{2,4}(j) = (C+D)/2 = \tfrac{1}{2}[V_3^{1,4}(j) + V_4^{1,4}(j)]$$
(10)

Generalizing the relationship we see developing in eq. 10

$$V_i^{2,4}(j) = \tfrac{1}{2} \sum_{r=1}^{2} V_{i+r-1}^{1,4}(j),$$ (11)

$$i = 1, 2, \ldots (I-1)$$

descriptive of the action of the first XAV stage.

Following the XAV second stage logic in FIG. 7 we obtain, $$V_1^{4,4}(j) = (A + B + C + D)/4 = \tfrac{1}{4} \sum_{r=1}^{4} V_r^{1,4}(j),$$

which generalizes to $$V_i^{4,4}(j) = \tfrac{1}{4} \sum_{r=1}^{4} V_{i+r-1}^{1,4}(j),$$ (12)

$$i = 1, 2, \ldots (I - 3)$$

The output of the XAV third stage (not shown in FIG. 7) is found to be $$V_i^{8,4}(j) = \tfrac{1}{8} \sum_{r=1}^{8} V_{i+r-1}^{1,4}(j),$$ (13)

$$i = 1, 2, \ldots (I - 7).$$

Inspection of eqs. 11 through 13 indicates the general input/output description of XAV can be written as $$V_i^{k,4}(j) = 1/k \sum_{r=1}^{k} V_{i+r-1}^{1,4}(j),$$ (14a)

$$k = 2, 4, 8$$
$$i = 1, 2, \ldots (I - k + 1)$$

Cross-channel averaging successively reduces the number of elevation channels (and hence the maximum value of i) at progressively higher resolutions $$I(k) = max(i) = I - k + 1,$$ (15)

where the number of elevation channels at the original resolution, I, is given by eq. 1.

It follows from eqs. 14a and 14b (below) that cross-channel processing is instantaneous, i.e., determination of $V_i^{k,4}$ at time j depends only on values of $V_m^{1,4}$, also at sampling time j (where m=1,2, ... I).

The position of XAV within the overall processing structure is indicated in FIG. 6.

Equivalent to eq. 14a, we can write $$V_i^{2k,4}(j) = \tfrac{1}{2}[V_i^{k,4}(j) + V_{i+k}^{k,4}(j)],$$ (14b)

$$k = 1, 2, 4$$
$$i = 1, 2, \ldots (I - 2K + 1).$$

Figure 8:
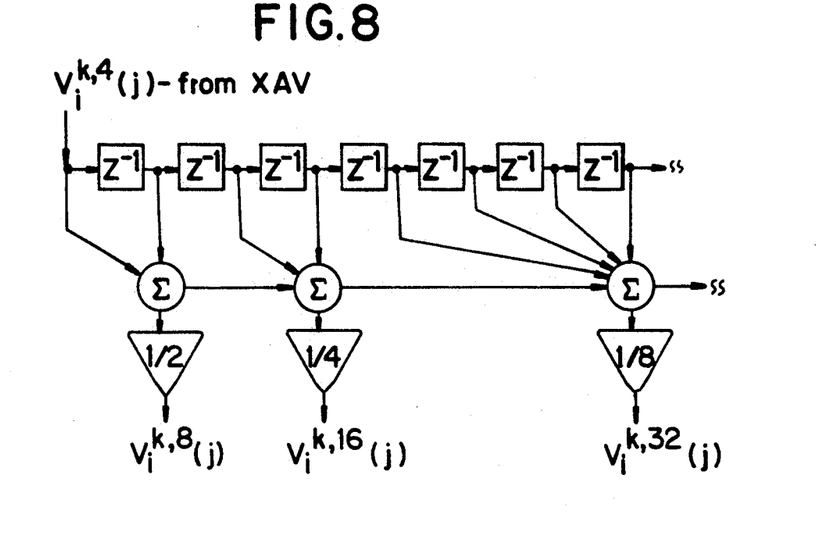
FIG. 8 is a schematic of one section of the in-scan averaging (IAV) processor of the invention.

The in-scan averaging processor (IAV) is comprised of a large number of identical processing "sections", each structured as a transversal filter (or tapped delay line) as shown in FIG. 8. Since a separate IAV section is required for each distinct pair of values (i,k), the total number of required sections (each identical to FIG. 8) may be computed as $$N_{IAV} = \Sigma I(k)$$
$$k = 2, 4, 8$$

With I(k) given by eq. 15, $$N_{IAV} = \Sigma (I - k + 1) = 3I - 11.$$ (16)
$$k = 2, 4, 8$$

For example, if the scanning sensor has $$I = 128$$ (17)

detector channels, from eq. 16, it is found that $$N_{IAV} = 373$$ (18)

IAV sections, each identical to FIG. 8, will be required.

More generally, the number of required IAV sections may be simply estimated as I times the number of required cross-scan averaging stages.

The action of IAV is developed with reference to FIG. 8 as $$V_i^{k,8}(j) = \frac{1}{2} \sum_{s=1}^{2} V_i^{k,4}(j - s + 1) \tag{19}$$

$$V_i^{k,16}(j) = \frac{1}{4} \sum_{s=1}^{4} V_i^{k,4}(j - s + 1)$$

$$V_i^{k,32}(j) = \frac{1}{8} \sum_{s=1}^{8} V_i^{k,4}(j - s + 1),$$

which generalizes readily as $$V_i^{k,4n_o}(j) = 1/n_o \sum_{s=1}^{n_o} V_i^{k,4}(j - s + 1), \tag{20}$$

$$j = n_o, (n_o + 1), (n_o + 2), \ldots$$
$$n_o = 2, 4, 8, 16$$

If the maximum and minimum values of in-scan resolution index are denoted, respectively, as $n_{max}$ and $n_{min}$, the number of delay/memory elements in each IAV section (FIG. 8) is given by $$N_{delays} = (n_{max}/n_{min}) - 1. \tag{21}$$

For the example of eq. 3

$$N_{delays} = (64/4) - 1 = 15, \tag{22}$$

delay elements per IAV section are obtained. For this example, IAV provides outputs corresponding to the following five in-scan resolutions $$n = 4, 8, 16, 32, 64. \tag{23}$$

The number of required delay elements can become quite large for IAV sections structured as per FIG. 8. For example, if instead of eq. 23
$$n = 1, 2, 4, 8, 16, 32, 64, 128, \tag{24}$$

the number of delay elements per IAV section increases from 15 to 127 in spite of the fact that the number of in-scan resolutions has only been increased from 5 to 8.

Figure 9:
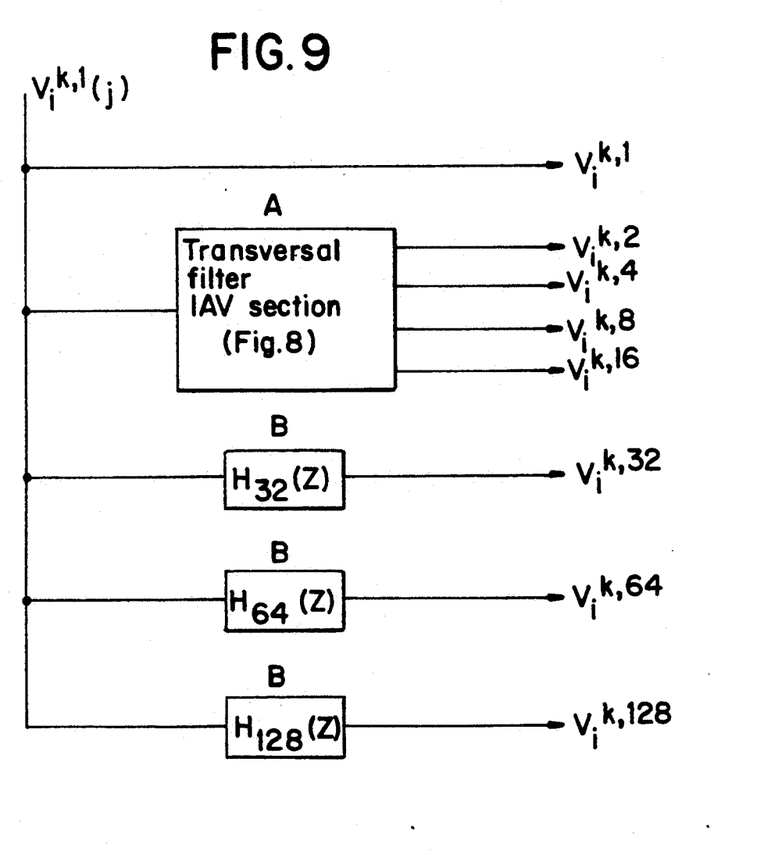
FIG. 9 is a schematic of a modified section of an IAV to minimize the number of required delay elements.

Depicted in FIG. 9 is an alternative structure for the IAV sections, modified from FIG. 8 to reduce the required number of delay elements. The processing element labeled "A" in FIG. 9 is structured like the original IAV section, FIG. 8. Each of the boxes labeled "B" in FIG. 9 is an infinite-impulse-response (IIR) approximation to eq. 20 for the appropriate value of $n_o$.

Figure 10:
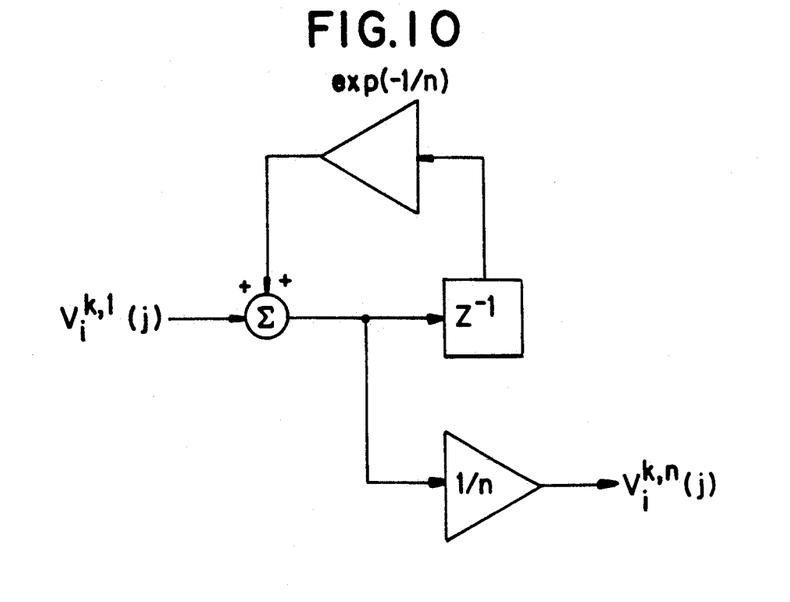
FIG. 10 is a block diagram of an infinite-impulse-response (IIR) filter implementation of a portion of one section of the IAV depicted in FIG. 9.
Figure 11:
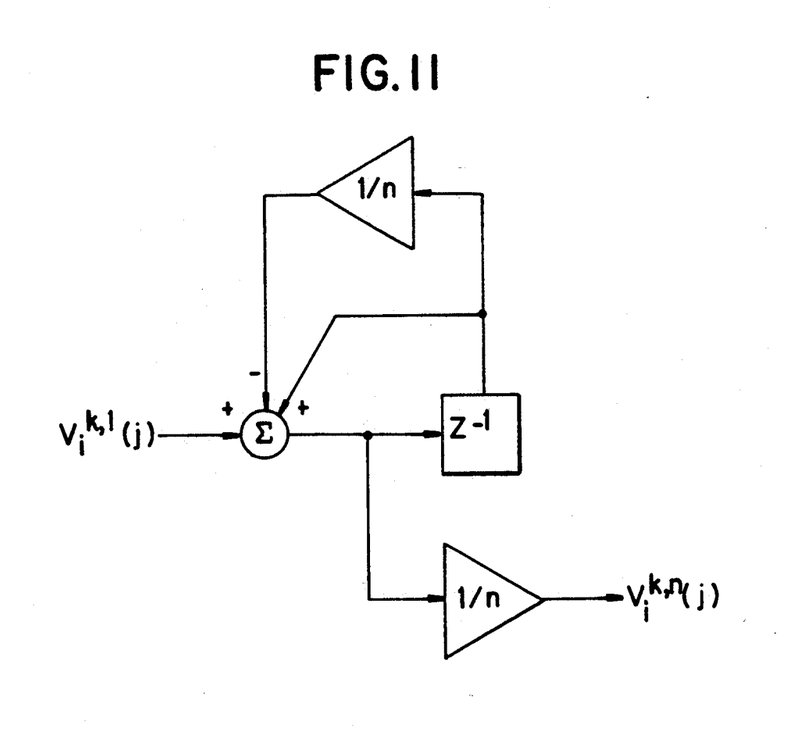
FIG. 11 is a block diagram of another IIR filter implementation.

Particularly simple IIR structures, shown in FIGS. 10 and 11, require just one sample delay per filter function, $H_n(Z)$. Following this approach, the IAV section corresponding to the eight in-scan resolutions given by eq. 24 can be implemented with just 18 delay elements rather than 127 elements, as would be required by the original approach (FIG. 8) alone.

Of course, the reduced number of processing elements achieved via IIR processing (FIG. 10) relative to finite-impulse response (FIR) processing (FIG. 8) is at the expense of reduced SNR. The SNR penalty involved in developing IIR approximations to eq. 20 depends on the order of the IIR filter.

Figure 12:
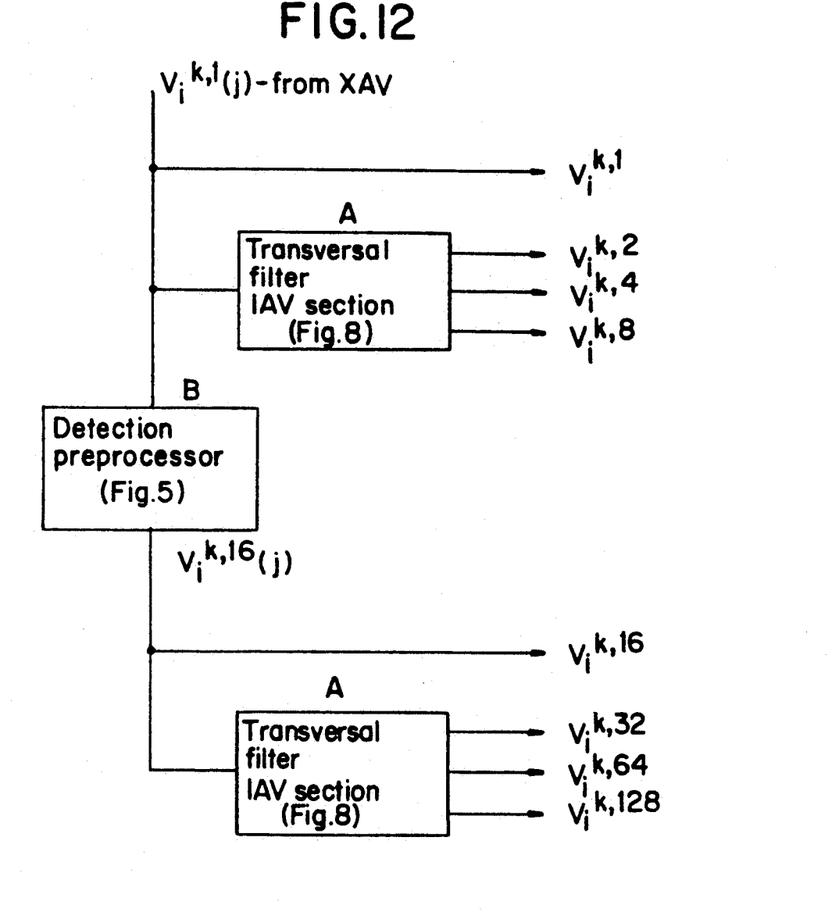
FIG. 12 is a schematic of an alternative IAV structure to minimize the number of delay elements.

Yet another approach to designing IAV sections to minimize the number of processing elements is shown in FIG. 12. The components labeled "A" in FIG. 12 are structured as per FIG. 8; the component labeled "B" in FIG. 12 is structured like the detection preprocessor (FIG. 5/eq. 4), but modified for 16-fold resolution reduction and decimation-in-time.

The multi-resolution filter bank is realized by concatenating XAV and IAV, as shown in FIG. 6. A single input/output relationship for these two combined filters is obtained by substituting eq. 14a into eq. 20, with the result $$V_i^{k,4n_o}(j) = (1/kn_o) \sum_{s=1}^{n_o} \sum_{r=1}^{k} V_{i+r-1}^{1,4}(j - s + 1), \tag{25}$$

which may be written in a compressed notation as $$V^{k,4n_o} = V^{1,4} \circledast rect(k, n_o), \tag{26}$$

where
$V^{1,4} = \{V_i^{1,4}(j)\}_{ij}$ = image at output of detection preprocessor, FIG. 5
$V^{k,4n_o} = \{V_i^{k,4n_o}(j)\}_{ij}$ = reduced resolution image with indices $(k, 4n_o)$
$rect(k, n_o)$ = 2-D rectangle function, of dimensions $k \times n_o$ and amplitude $(1/kn_o)$.

Figure 13:
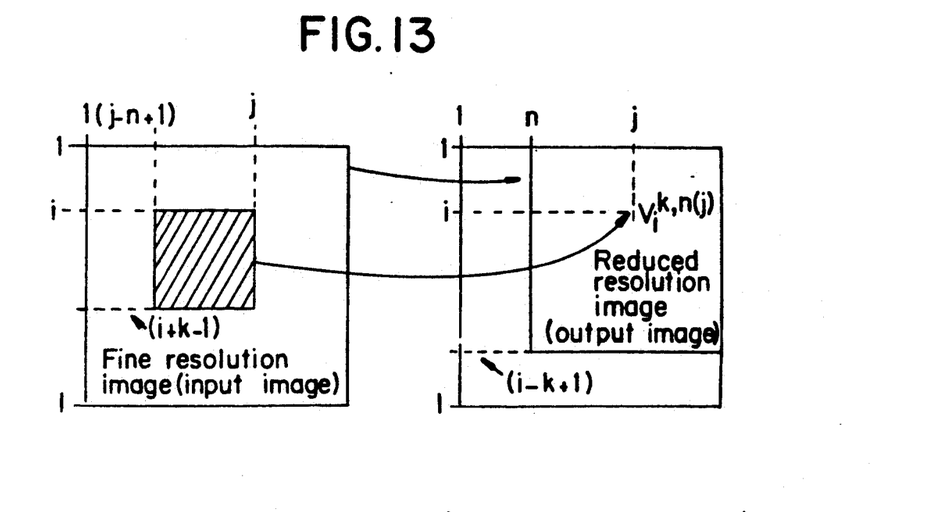
FIG. 13 illustrates an interpretation of the invention's processing method.

The meaning of eqs. 25 and 26 is explained with the aid of FIG. 13. As shown in the figure, the effect of image convolution with a rectangular smoothing function is to perform a mapping from a fine resolution image to a reduced resolution/smoothed image, in which the (i,j)-pixel value in the reduced resolution image is obtained as the average of the pixel values within a rectangular region of dimensions $k \times n_o$, whose upper-right-hand corner is located at the (i,j)-pixel location in the input image.

The development of a multi-resolution spatial filter array via the structure of FIGS. 7 through 12 is a fundamental aspect of the invention described and claimed herein. Some advantages of this approach are that:

a. The image data are processed sequentially by column; since scanned linear arrays acquire imagery sequentially by column, the processing approach described eliminates the need to buffer large amounts of data; and b. The total processor comprises a large number of simple, identical, modules, operating in parallel, and is thus inherently well-suited to real-time applications.

Figure 14A:
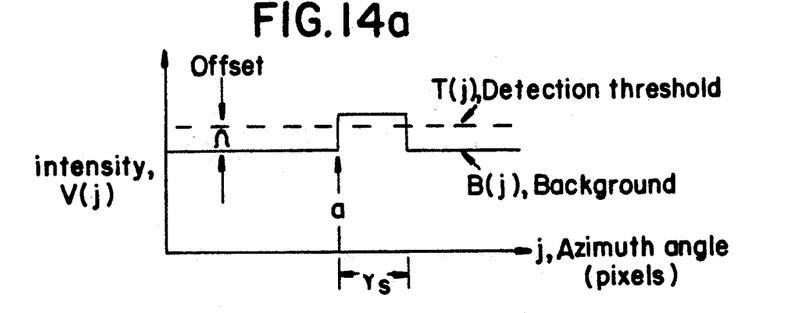
FIG. 14a-c the various parameters involved in background estimation and subtraction.
Figure 14B:
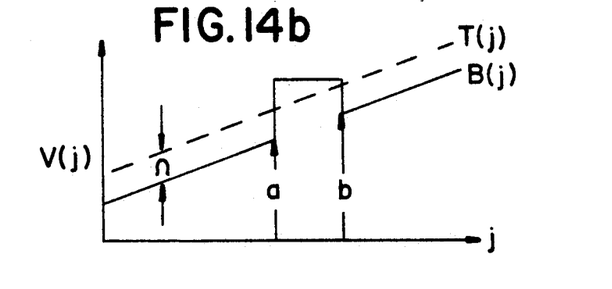
Figure 14C:
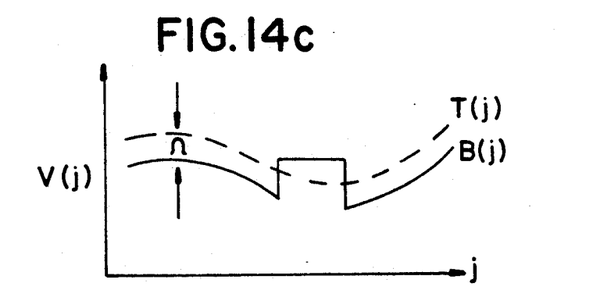

The need for background estimation and subtraction (BES) is explained with the aid of FIG. 14. The detection problem is conceptualized as being one-dimensional in FIG. 14 to simplify the discussion.

FIG. 14 depicts a target of size $\gamma_s$ pixels observed against three types of backgrounds, viz., a constant background of unknown intensity (part a); a background of constant but unknown intensity gradient (part b); and a "slowly varying" background (part c). Successful detection requires that the invention establish an intensity threshold, $T(j)$, that rides above the unknown and possibly varying background, $B(j)$, by a fixed intensity offset, $\Omega$.

Figure 15:
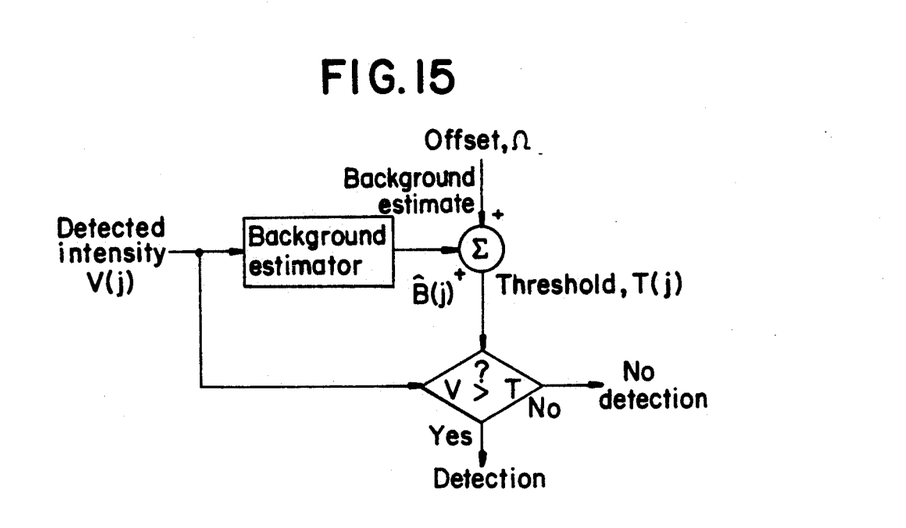
FIG. 15 illustrates a block diagram of a processor for implementing threshold detection.

FIG. 15 depicts a conceptual means for establishing the threshold and accomplishing detection as per the examples in FIG. 14. Estimating under the null target hypothesis what the background would have been at each position j, B(j), appears to be an essential element in developing a threshold T(j) for target detection against spatially varying backgrounds.

Equivalent to FIG. 15, the detection process can be conceived as being accomplished in two stages, viz., background estimation and subtraction (BES)

$$C(j) = V(j) - B(j), \quad (27)$$

followed by threshold detection $$C(j) \underset{<}{>} \Omega \quad (28)$$

where C(j) is the area-averaged contrast.

A process analogous to eq. 27 is separately applied to all waveforms, i.e., $$\hat{C}_i^{k,n}(j) = V_i^{k,n}(j) - \hat{B}_i^{k,n}(j), \quad (29)$$

as shown in FIG. 6.

A number of candidate filters for developing the background estimate, $\hat{B}$, is discussed next.

Assuming that the direction of scan is parallel to the horizon, the background estimate may be developed as $$\hat{B}_i^{k,n}(j) = V_i^{k,n}(j - nu). \quad (30)$$

In the event that the background level is found to contain appreciable variation over in-scan angles $\approx n\alpha$, an alternative background estimator is $$\hat{B}_i^{k,n}(j) = [V_i^{k,n/2}(j - 5nu/4) + V_i^{k,n/2}(j + 5nu/4)]/2. \quad (31)$$

Figure 16A:
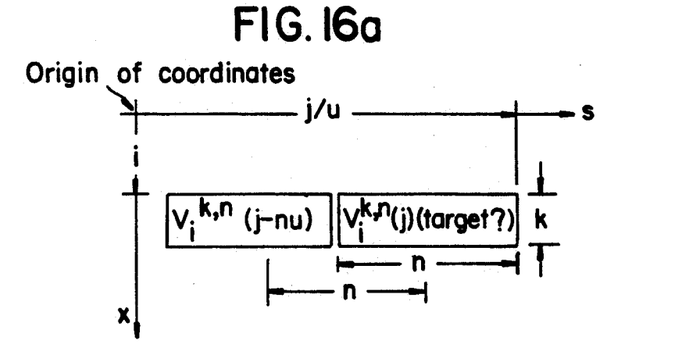
FIG. 16a and b illustrates image areas used by two background estimators.
Figure 16B:
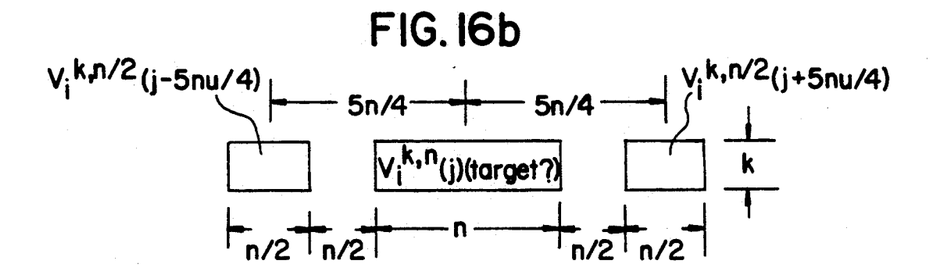

The image areas ("windows") used by the background estimators, eqs. 30 and 31, are depicted in FIG. 16. The "window gaps" in FIG. 16b, separating the background windows from the target window, are intended to prevent target self-thresholding (with a consequently degraded SNR) when the target's in-scan extent, $\gamma_s$, over-spills the target window; i.e., when $$n\alpha < \gamma_s \leq 2n\alpha. \quad (32)$$

The variance of a random process X(t) is denoted as $$Var(X) = E\{[X - E(X)]^2\}, \quad (33)$$

where E {.} indicates expectation over sensor noise statistics. For spatially uniform backgrounds, specifically excluding the possibility of a target in the scene, we define $$\sigma_{kn}^2 = Var[V_i^{kn}(j)], \quad (34)$$

where the presumed lack of dependence of $\sigma_{kn}^2$ on i is discussed below.

Since $V_i^{k,n}(j)$ is statistically independent of $\hat{B}_i^{k,n}(j)$ for all background estimators of interest, it follows from eqs. 29 and 34 that $$Var[C_i^{kn}(j)] = \sigma_{kn}^2 + Var[\hat{B}_i^{kn}(j)]. \quad (35)$$

It follows from eqs. 30 and 31 that, for both of these background estimators, $$Var[\hat{B}_i^{kn}(j)] = \sigma_{kn}^2. \quad (36)$$

Thus, from eqs. 35 and 36, $$Var[C_i^{kn}(j)] = 2\sigma_{kn}^2, \quad (37)$$

i.e., for both background estimators considered thus far, the differencing process used to develop estimated contrast degrades two-fold the variance of the waveforms.

Figure 17:
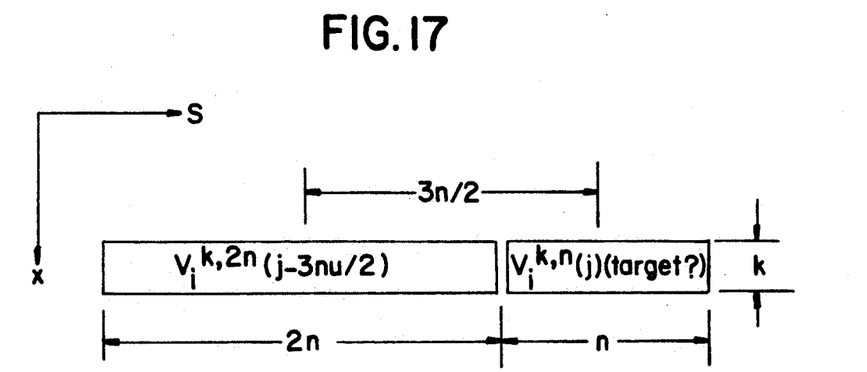
FIG. 17 illustrates an image area used by low-noise background estimator.

A relatively less noisy contrast can be developed by using a larger background window; e.g., $$\hat{B}_i^{kn}(j) = V_i^{k,2n}(j - 3nu/2), \quad (38)$$

depicted in FIG. 17. It follows from eq. 38 that $$Var[\hat{B}_i^{kn}(j)] = \sigma_{kn}^2/2. \quad (39)$$

and from eq 39 and 35 that $$Var[C_i^{kn}(j)] = 1.5\sigma_{kn}^2. \quad (40)$$

Comparing eqs. 37 and 40, we see that the background estimate provided by eq. 38 results in a lower-noise contrast estimate.

The use of larger background windows (e.g., FIG. 17) provides improved acquisition performance against unstructured backgrounds at the expense of reduced performance against structured ("cluttered") backgrounds. The trade-offs involved in selecting the MRSI background estimator window dimensions are in many respects analogous to those encountered in designing signal processors for detecting spatially unresolved targets, commonly known as infrared search and track (IRST) devices.

Developing the background estimate for parallel-to-horizon scanning via Eq. 30, 31, or 38 imposes an additional memory requirement beyond that already required by IAV.

Assuming that the direction of scan is perpendicular to the horizon, the background estimator analogous to eq. 30 is $$\hat{B}_i^{kn}(j) = V_{i+k}^{kn}(j). \quad (41)$$

Figure 18:
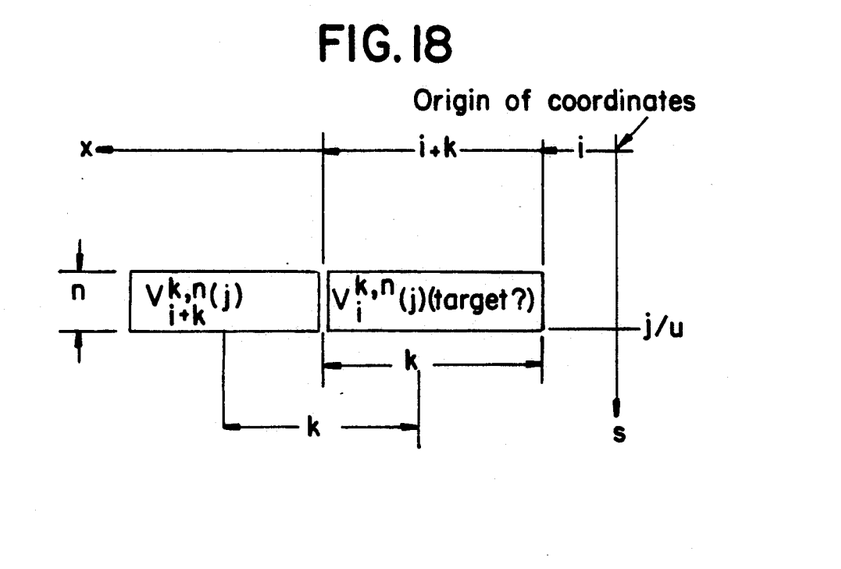
FIG. 18 illustrates an image area used by background estimator where scan direction is perpendicular to the horizon.

Image relevant to 41 depicted in FIG. 18.

Analogous to eqs. 31 and 38, one now has for cross-horizon scanning $$\hat{B}_i^{kn}(j) = [V_{i-k}^{k/2,n}(j) + V_{i+3k/2}^{k/2,n}(j)]/2, \quad (42)$$

and $$\hat{B}_i^{kn}(j) = V_{i+k}^{2k,n}(j). \quad (43)$$

Developing background estimates for cross-horizon scanning via eq. 41, 42, or 43 imposes no additional memory requirement beyond that already required by IAV.

Threshold/decision processing (TD) is based on performing a forced-choice detection in each frame. Thus, rather than perform the threshold comparison indicated in eq. 28, the TD processor takes the form shown in FIG. 19. Each contrast image $$\{C_i^{k,n}(j)\}_{ij}$$

is normalized with respect to a noise standard deviation, $\sigma_{k,n}$ to obtain a "signal-to-noise image". The entire set of normalized contrast images is then examined for a global maximum to provide the forced-choice detection. No image storage is required to implement TD, since the search for the "brightest pixel" is performed one column at a time. As a practical matter $$\max_{i,j,k,n}[C_i^{k,n}(j)] = \max_j W(j), \quad (44)$$

is calculated, where $$W(j) = \max_{i,k,n}[C_i^{k,n}(j)]. \quad (45)$$

The "high data rate" part of the search process is contained in eq. 45. For the set of 13 spatial resolutions given by the example of FIG. 4, and assuming that the seeker has I=128 detector channels (as per eq. 17), it can be shown that eq. 45 implies that, at every fourth sampling instant, TD must find the largest of $N_w$ values, where $$N_w = 4I(2) + 5I(4) + 4I(8),$$

with I(k) given by eq. 15. Thus, implementation of eq. 45 requires that on every fourth sampling instant, TD find the maximum of 1617 data values.

TD can be modified simply to accommodate multiple target detections within a large field-of-view by implementing eq. 44 as a search for local maxima in W(j)—so long as the various targets are spatially well separated in azimuth.

Figure 19:
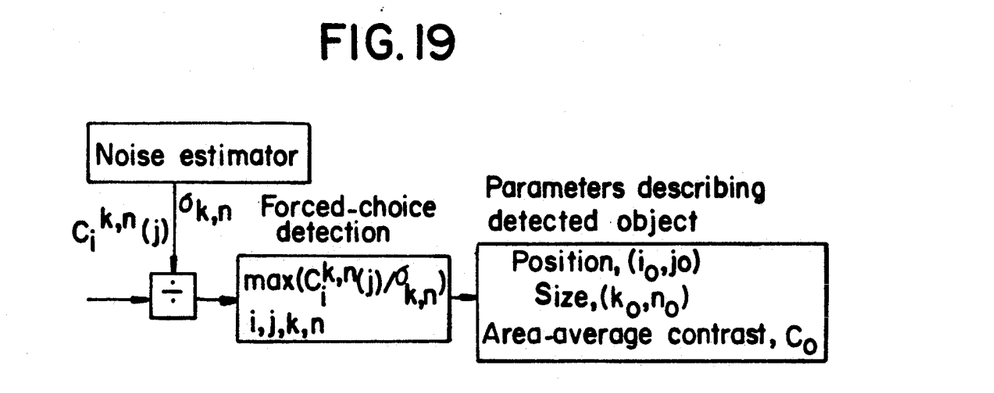
FIG. 19 illustrates threshold/decision (TD) logic for forced-choice detection.

The action of the noise estimation (NE) component of FIGS. 6 and 19 is discussed next. The purpose of NE is to establish estimates for the noise variances $\alpha^2_{k,n}$ defined in eq. 34.

The root-mean-square (RMS) noise levels of the individual cross-scan channels are denoted as $$\sigma_i, \; i=1,2,\ldots,I,$$

where $\alpha_1$ is the RMS value of an additive noise component of waveform $V_1(j)$, $\sigma_2$ corresponds similarly to $V_2(j)$, etc. Assuming that the noise level is about the same for each channel $$\sigma_i \approx \sigma_o, \; i=1,2,\ldots,I, \quad (46)$$

and that the additive noise is signal-independent, $$\partial \sigma_i / \partial V_i = 0, \quad (47)$$

the RMS noise of waveform $V_i^{kn}(j)$ at the output of IAV is given by $$\sigma_{kn} = \sigma_o/(kn)^{\frac{1}{2}}. \quad (48)$$

If the different° cross-scan channels have appreciably different noise levels, invalidating eq. 46, it may then be desirable to include a noise calibration mode in the signal processor. This entails illuminating the focal plane uniformly (e.g., by staring into the radiant source used also for dc-restoration), and then using the sample variance of $V_i^{kn}(j)$ as an estimate for $\sigma_{kn}^2(i)$. The RMS noise, $\sigma_{kn}$, in eq. 48 is then replaced by $\sigma_{kn}(i)$.

The possibility of implementing a noise calibration mode (as an alternative to implementing a "hardwired" calibration, eq. 48), is indicated in FIG. 6 as a dashed connection between IAV and NE.

MRSI processing, i.e., synchronous area integration, under a broad variety of conditions, provides about ten-fold SNR enhancement ("processing gain") relative to hot-spot detection. Moreover, the processing gain turns out to be computable, with no more than about 10% maximum error in every case, as $$G = \eta N_{NIX}^{\frac{1}{2}} \quad (47)$$

where $N_{PIX}$ is the number of pixels occupied by the target in the image, and $\eta$ is given by $$\eta = 0.81.$$

The processing constant, $\eta$, is remarkably invariant with respect to sensor/ship range (i.e., scale), viewing aspect, and ship type.

The existence of a simply-computed analytical expression for processing gain, eq. 47, is in itself a significant result, as it eliminates the need to perform image-based simulations in connection with cost/performance trade studies involving such additional aspects of design as focal plane sensitivity requirements. At least as regards first-order system performance assessments, eq. 47 may be used as a vastly simpler substitute for detailed image-based simulations.

What I claim is:

1. A signal processor for detecting a rectangular or nearly-rectangular target of known orientation in a digitized two-dimensional input image, wherein said target's size, aspect ratio and position in said input image are unknown, and wherein said target has minimum contrast relative to its background in said input image, said signal processor comprising means for generating a plurality of reduced resolution, rectangular images as output from said input image, said input image being generated by an imaging sensor comprised of an array of detector elements and having a higher resolution than said output images.

2. The signal processor as recited in claim 1, further comprising means for preprocessing said input image to smooth and decimate in time the waveforms comprising said input image and received from said detector elements, prior to said input image being received by said generating means.

3. The signal processor as recited in claim 1, wherein said generating means comprises means for averaging in a plurality of stages the waveforms received from said detector elements and comprising said input image, to generate at each stage a rectangular output image at a level of reduced resolution corresponding to said stage.

4. The signal processor as recited in claim 3, wherein said averaging means comprises:

means for cross-channel averaging in a plurality of stages said waveforms, to generate at each stage a rectangular, cross-channel output image at a level of reduced cross-channel resolution corresponding to said stage; and means for in-scan averaging in a plurality of sections said cross-channel output images, each of said sections averaging one of said cross-channel output images in a plurality of stages, to generate in each section a plurality of reduced resolution, rectangular output images corresponding to said stages.

5. The signal processor as recited in claim 4, wherein said in-scan averaging means comprises a plurality of sequentially connected delay elements in each of said sections, the outputs of said delay elements being averaged in stages, to generate in each section a plurality of reduced resolution, rectangular output images corresponding to said stages.

6. The signal processor as recited in claim 5, wherein said delay elements whose averaged outputs comprise one of said stages are replaced by one delay element and a fixed gain amplifier connected to said one delay element to produce an infinite-impulse-response output approximation of said delay elements' averaged output in said stage.

7. The signal processor as recited in claim 5, wherein said delay elements whose averaged outputs comprise one of said stages are replaced by a means for decimating in time said cross-channel output image to produce an output equivalent to said delay elements' averaged output in said stage.

8. The signal processor as recited in claim 1, wherein said generating means comprises means for performing a mapping from said higher resolution input image to said reduced resolution, rectangular output images, wherein said performing means comprises means for averaging the pixel values within a rectangular region of dimensions $kxn_o$ in said input image, the upper-right-hand corner of said rectangular region being located at the (i,j)-pixel location in said input image, to obtain the (i,j)-pixel value in each of said output images.

9. The signal processor as recited in claims 1 or 2, further comprising:
    means for estimating background noise intensity contained in said reduced resolution, rectangular output images;
    means for subtracting said background noise intensity from said output images to produce contrast images; and
    means for detecting said target embedded in said contrast images.

10. The signal processor as recited in claim 9, wherein said detecting means comprises means for comparing said contrast images with an intensity offset to detect said contrast images greater than said offset.

11. The signal processor as recited in claim 9, wherein said detecting means comprises:
    means for estimating a noise standard deviation for said contrast images;
    means for normalizing said contrast images with respect to said noise standard deviation; and
    means for examining said normalized contrast images to detect a global maximum to provide a forced-choice detection.

12. A method for detecting a rectangular or nearly-rectangular target of known orientation in a digitized two-dimensional input image, wherein said target's size, aspect ratio and position in said input image are unknown, and wherein said target has minimum contrast relative to its background in said input image, said method comprising the step of generating a plurality of reduced resolution, rectangular images as output from said input image, said input image being generated by an imaging sensor comprised of an array of detector elements and having a higher resolution than said output images.

13. The method as recited in claim 12, further comprising the step of preprocessing said input image to smooth and decimate in time the waveforms received from said detector elements and comprising said input image, prior to said generating step.

14. The method as recited in claim 12, wherein said generating step comprises the step of averaging in a plurality of stages the waveforms comprising said input image and received from said detector elements, to generate at each stage a rectangular output image at a level of reduced resolution corresponding to said stage.

15. The method as recited in claim 14, wherein said averaging step comprises the steps of:
    cross-channel averaging in a plurality of stages said waveforms, to generate at each stage a rectangular, cross-channel output image at a level of reduced cross-channel resolution corresponding to said stage; and
    in-scan averaging in a plurality of sections said cross-channel output images, each of said sections averaging one of said cross-channel output images in a plurality of stages, to generate in each section a plurality of reduced resolution, rectangular output images corresponding to said stages.

16. The method as recited in claim 15, wherein said in-scan averaging step comprises the steps of:
    connecting sequentially a plurality of delay elements in each of said sections; and
    averaging the outputs of said delay elements in stages, to generate in each section a plurality of reduced resolution, rectangular output images corresponding to said stages.

17. The method as recited in claim 16, wherein said averaging step comprises the step of producing an infinite-impulse-response approximation of at least one of said stages.

18. The method as recited in claim 16, wherein said averaging step comprises the step of decimating in time said cross-channel output image in at least one of said stages.

19. The method as recited in claim 12, wherein said generating step comprises the step of performing a mapping from said higher resolution input image to said reduced resolution, rectangular output images, wherein said performing step comprises the step of averaging the pixel values within a rectangular region of dimensions kxn in said input image, the upper-right-hand corner of said rectangular region being located at the (i,j)-pixel location in said input image, to obtain the (i,j)-pixel value in each of said output images.

20. The method as recited in claims 12 or 13, further comprising the steps of:
    estimating background noise intensity contained in said reduced resolution, rectangular output images;
    subtracting said background noise intensity from said output images to produce contrast images; and
    detecting said target embedded in said contrast images.

21. The method as recited in claim 20, wherein said detecting step comprises the step of comparing said contrast images with an intensity offset to detect said contrast images greater than said offset.

22. The method as recited in claim 20, wherein said detecting step comprises the steps of:
    estimating a noise standard deviation for said contrast images;
    normalizing said contrast images with respect to said noise standard deviation; and
    examining said normalized contrast images to detect a global maximum to provide a forced-choice detection.

23. The signal processor as recited in claim 1, wherein said output images are not reduced in dimensionality from said input image.

24. The signal processor as recited in claim 1, wherein the processing gain of said signal processor is computable, with no more than about 10% maximum error, as $G = \eta N_{Pix}^{\frac{1}{2}}$, where $N_{Pix}$ is the number of pixels occupied by said target in said input image and $\eta = 0.81$.

25. The method as recited in claim 12, wherein said output images are not reduced in dimensionality from said input image.

26. The method as recited in claim 12, wherein the processing gain resulting from said method is computable, with no more than about 10% maximum error, as $G = \eta N_{Pix}^{\frac{1}{2}}$, where $N_{Pix}$ is the number of pixels occupied by said target in said input image and $\eta = 0.81$.

* * * * *

UNITED STATES PATENT AND TRADEMARK OFFICE
CERTIFICATE OF CORRECTION

PATENT NO. : 5,257,121
DATED : October 26, 1993
INVENTOR(S) : Richard A. Steinberg It is certified that error appears in the above—identified patent and that said Letters Patent is hereby corrected as shown below:

Column 16, line 29, delete "kxn" and substitute therefor -- $kxn_o$ --.

Signed and Sealed this

Tenth Day of May, 1994

Attest:

BRUCE LEHMAN

Attesting Officer

Commissioner of Patents and Trademarks